United States Patent Office 3,174,931
Patented Mar. 23, 1965

3,174,931
GREASE COMPOSITIONS
Howard J. Matson, Harvey, John W. Nelson, Lansing, and Martin M. McCormick, Chicago, Ill., assignors to Sinclair Research, Inc., Wilmington, Del., a corporation of Delaware
No Drawing. Filed Dec. 5, 1961, Ser. No. 157,264
6 Claims. (Cl. 252—37.2)

This invention relates to grease compositions and in particular is concerned with grease compositions containing halogen derivatives of certain phenolic-phosphorous compounds.

In the present invention we have discovered that grease compositions can be prepared which have a materially increased dropping point. Furthermore, we have discovered that grease compositions can be prepared which in addition to enhanced dropping point exhibit improvement in extreme pressure, bleed and oxygen stability characteristics. These advantages are obtained in accordance with our invention by incorporating in a lubricating grease a compound having the general formula:

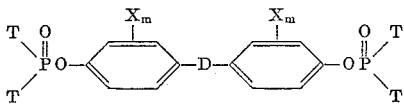

wherein P is phosphorus; O is oxygen; X is a halogen of 17 to 53 atomic number, preferably chlorine; $m$ is 1 to 4, preferably 1 to 2; D is a lower aliphatic divalent hydrocarbon radical, e.g. of 1 to 4 carbon atoms which can be straight or branched chained, preferably branched and T is a radical selected from the group consisting of (a)

(b)

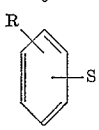

in which O is oxygen; S is sulfur; and R is an alkyl radical of 1 to 20 carbon atoms with the proviso that at least one T on each phosphorous atom is

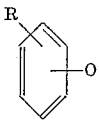

The R group should be of sufficient length to give solubility to the compound and preferably the R group will average 4 or more carbon atoms. The preferred compounds are those in which one of the T substituents on each of the phosphorous atoms is

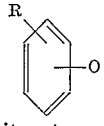

and the other T substituent on the same phosphorous atom is

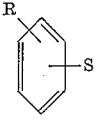

When both sulfur and oxygen are present in the compound, it is preferred that at least one of the R groups average 10 or more carbon atoms.

In general, the compounds of the present invention are the condensation products of bisphenols such as 2,2-bis(halo-4-hydroxyphenol) propane with a monophenol or thiophenol and a phosphorus halide. Particularly preferred bisphenols are the bis(2,5-dichloro) compounds such as 2,2-bis(2,5-dichloro-4-hydroxyphenol) propane.

The monophenol and/or thiophenol reactants of the present invention can be alkylated as with an alkyl group of 1 to 20 carbon atoms, preferably 4 to 12 carbon atoms; the alkyl group being preferably located in a para-position to the —SH or OH group. Particularly suitable alkylated phenols and thiophenols are, for example, para tertiary butyl phenol, para tertiary octyl phenol, para tertiary butyl thiophenol and the like.

The compounds of the present invention can be conveniently prepared in a hydrocarbon solvetn, for instance, toluene, xylene, etc, etc. at atmospheric pressure and temperatures of about 100 to 250° C., generally from about 100 to 150° C. using an amine such as pyridylamine, triethylamine, etc. as a hydrogen halide acceptor. The preparation can be, for instance, by first slowly adding 2 moles of a monophenol or thiophenol to 1 mole of POCl₃ to replace 2 of the halide atoms. Two of the resulting monohalide molecules are then coupled with the bis-hydroxy reactant such as 2,2-bis(3,5-dichloro-4-hydroxyphenol) propane.

The additives of the present invention are incorporated in grease compositions in small minor amounts sufficient to provide the grease composition with an increased dropping point. This amount is generally about 0.1 to 10%, depending on the particular grease composition used, its hardness and application. The preferred concentration should be the minimum amount to give the desired dropping point increase for the particular application and usually will be about 1 to 5%.

The grease constituent of our new compositions can be any known grease covering the entire range of N.L.G.I. classifications, for instance, the fatty component materials having from about 10 to 32 carbon atoms and can be saturated or unsaturated and substituted as with other polar groups. These materials include acids such as palmitic, stearic, oleic, linoleic, ricinoleic, palm oil fatty acids, cottonseed mixtures, etc. Also, the glycerides of these acids can be used such as lard, lard oil, rape seed oil, palm seed oil, etc. Other acids which can be employed are those derived from petroleum such as naphthenic acids, petroleum sulfonic acids and petroleum oil and wax oxidates. The preferred saponifiable materials are those which contain a hydroxyl group at least 12 carbon atoms removed from the carboxyl group, e.g. 12-hydroxy stearic acid and hydrogenated castor oil.

Among the saponifying or soap-forming bases which can be used in our invention are the alkali metal bases such as those of lithium, sodium and potassium, and the alkaline earth metal bases such as those of barium, calcium and strontium. Other saponifying metals normally used in forming the soap constituents of greases can be employed, e.g. aluminum, lead, cerium and the like. Mixtures of these soaps can also be utilized. The soap content of our grease compositions will usually vary within the range of about 5 to 25%; most advantageously the soap content will vary between about 5 and 15% by weight based on the total composition.

Greases employed in the present invention can be oil base greases having a mineral oil or synthetic oil base such as synthetic diester base greases, e.g. di-(2-ethyl hexyl adipate). The mineral oils which can be used are of wide viscosity range, for instance, from about 50 SUS at 100° F. to about 2000 SUS at 210° F. The oil can be highly refined and solvent-treated, if desired, by known means. Among the synthetic lubricants which can be employed are polymerized olefins, alkylated aromatics, silicone polymers, polyalkylene glycols and their partial or complete ethers and esters.

Grease compositions to be used in the present invention can be prepared from preformed soaps, or the soaps can be formed in situ in a grease forming base. In general, we prefer to thicken a base material, such as a mineral oil, with a soap formed in situ and then dehydrate and adjust the end properties of the grease to the desired range by incorporating additional base oil.

The novel grease base compositions containing the additives of the present invention can be made by incorporating the additive in a base grease such as made by thickening to grease consistency a solvent-refined Mid-Continent lubricating oil having a viscosity of about 60 SUS at 100° F. to 250 SUS at 210° F. with lithium 12-hydroxy stearate formed in situ. The additive can be dissolved in the grease at an elevated temperature, i.e. about 100 to 300° F., and then stirred to insure uniformity. Alternatively the additive can be incorporated in the starting oil or finishing oil in a conventional grease making process. Generally, a temperature of above about 200° F. is sufficient to dissolve the additive, and it is preferred to incorporate it at temperatures below about 330° F., however added. Other materials normally incorporated in greases can be added to the compositions. Other additives include stabilizing agents such as the higher polyalkylene glycols, oxidation inhibitors, corrosion inhibitors, and the like. Such additives are employed in the grease compositions usually in amounts ranging from 0.01% to 2% or more.

The following examples are included to illustrate the preparation of the condensation products of the present invention but are not to be considered limiting. Any method apparent to one skilled in the art can be employed in preparing the compounds.

EXAMPLE I 2,2-bis[3,5-dichloro-4-(di para tertiary octylphenyl phosphate) phenyl] propane

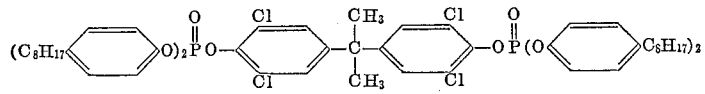

To an agitating mixture of one gram of MgCl$_2$, 3.25 moles of pyridine and one mole of POCl$_3$ in 600 g. of toluene were added over about one hour, two moles of para tertiary octylphenol, dissolved in 600 g. of toluene. A nitrogen blanket was employed during this time and the temperature rose to 65° C. Agitation was continued and heat was applied to the flask. After 30 minutes the toluene was refluxing at a pot temperature of 114° C. Heating and stirring were continued for about 6 hours and then the mass was allowed to stand and cool overnight after attaching a drying tube to the apparatus. The next day 0.5 mole of 2,2-bis(3,5-dichloro-4-hydroxyphenol) propane, dissolved in 1000 g. toluene and 110 g. acetone, were added while agitating the contents of the flask. Heat was applied and the acetone was removed intermittently via a Dean-Stark trap, until the pot temperature reached 113° C. Then about one gram of MgCl$_2$ was added and the mixture was heated at 113° C. and stirred for 8½ hours. After standing and cooling overnight the mass was filtered and washed three times with water and dilute sodium bicarbonate solution. This caused some hydrolysis of the compound to acids as evidenced by hydrion paper. After drying over anhydrous calcium sulfate the solution was filtered until clear. A portion was then topped to 215° C. at 8 mm. pressure. A yield of 85% of theory was obtained. The product analyzed percent P 4.95 (theo. 4.82) and percent Cl 11.1 (theo. 11.0).

EXAMPLE II 2,2-bis[3,5-dichloro-4-(para tertiary butylthiophenyl-para tertiary octylphenyl phosphate) phenyl] propane

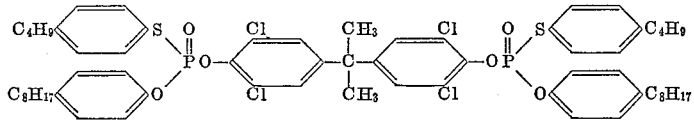

In a manner similar to Example I, one mole of 4-tertiary butylthiophenol dissolved in 400 g. of toluene was slowly added to the agitating 3.16 moles of pyridine and one mole of POCl$_3$ in 700 g. toluene, over 30 minutes. After stirring for about 3 hours at 93 to 112° C. one mole of para tertiary octylphenol in 300 g. toluene were added over 40 minutes. The mixture was then stirred at 112° C. for 2.5 hours after adding one gram of MgCl$_2$. A nitrogen blanket was employed during these additions. After standing and cooling overnight the mass was agitated and heated to 75° C. Then 0.5 mole of 2,2-bis(3,5-dichloro-4-hydroxyphenol) propane in 800 grams toluene at 80° C., were added and the temperature was raised to 112° C. After 3 hours one gram of MgCl$_2$ was added, and stirring and heating was continued for 5 hours before stopping the run for the night. The next day the mass was filtered and washed three times with water and methanol. The solution was then dried by stirring over anhydrous CaSO$_4$ and NaHCO$_3$ for 3 hours. After filtering, it was evaporated down to about one third its volume on a steam bath. It was then topped to 230° C. pot temperature at 8 mm. The product yield was 83.5% of theory. It analyzed percent P 5.37 (theo. 5.18), percent S 3.29 (theo. 5.34) and percent Cl 12.4 (theo. 11.85).

EXAMPLE III 2,2-bis[3,5-dichloro-4-(para tertiary butyl thiophenyl-para dodecyl phenylphosphate) phenyl] propane

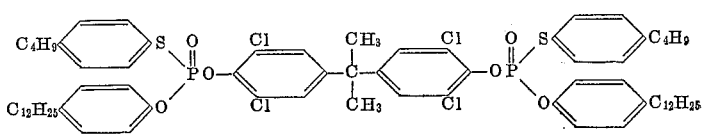

In a similar manner to Examples I and II, to the agitating mixture of two moles of pyridine and one mole of POCl$_3$ in 600 g. toluene, were added, over 40 minutes, one mole of para tertiary butylthiophenol in 400 g. toluene. Then a mole of dodecyl phenol in 400 g. toluene was added over about one hour. Heat was applied to raise the reaction temperature to 112° C. After about four hours one gram of MgCl$_2$, 0.5 mole of 2,2-bis(3,5-dichloro-4-hydroxyphenol) propane in 700 g. toluene and one mole of pyridine were added. Heating and stirring were continued for 2.5 hours. The next day the mass was filtered, washed three times with water-methanol and dried. It was finally topped to 228° C. at 6 mm pressure. The yield was 91% of theory. It analyzed percent P 5.02 (theo. 4.74), percent S 3.27 (theo. 4.87) and percent Cl 11.4 (theo. 10.82).

Examples IV and V are included to illustrate the advantages provided grease compositions by the additives of the present invention.

EXAMPLE IV 2 or 3 weight percent of the additives of Examples I, II and III were individually incorporated at a temperature of approximately 200° F. in a commercial 8% lithium 12-hydroxy stearate grease made in a base oil having a viscosity of 80 SUS at 210° F. and a viscosity index of about 63. The base oil consisted of a blend of about 57% conventionally refined naphthenic coastal neutral oil and about 43% Mid-Continent solvent refined residual oils. The grease compositions were analyzed and tested according to standard procedures to determine the characteristics of the grease. For comparison, the base grease without the additive of the present invention was also analyzed and tested. The results are shown in Table I below.

TABLE I

| Additive of Example | | I | II | III |
|---|---|---|---|---|
| Percent Additive | None | 2.0 | 2.0 | 3.0 |
| ASTM Dropping Point, °F | 378 | 500+ | 488 | 500+ |
| ASTM Penetrations: | | | | |
| Unworked | 302 | 270 | 239 | 233 |
| Worked 60 Strokes | 281 | 276 | 262 | 261 |
| 100,000 Strokes | 303 | 307 | 293 | 295 |
| MIL-G-10924A Pressure Bleed, percent Separated Oil | 4.3 | 3.0 | 1.5 | 2.1 |
| Wheel Bearing, 660 r.p.m., 250° F., Leakage, grams | 2.0 | 0.6 | 0.4 | 0.6 |
| 4 Ball Wear, 1,800 r.p.m., 130° F., 10 kg., 1 hour, mm. scar | 0.28 | 0.40 | 0.30 | 0.39 |
| 4 Ball EP: | | | | |
| Mean Hertz Load | 18.6 | 30.5 | 24.8 | 30.1 |
| Weld, kg | 141 | 141 | 126 | 141 |
| Timken EP: | | | | |
| Pass, lbs | 6 | 12 | | |
| Fail, lbs | 9 | 15 | | |

The data of Table I demonstrate the advantageous effects the additives of the present invention have in substantially increasing the dropping point of greases.

EXAMPLE V 2 weight percent of the additives of Examples I, II and III were individually added at a temperature of approximately 200° F. to a commercial 9% lithium 12-hydroxy stearate grease made in a base oil having a viscosity of about 57 SUS at 200° F. and a viscosity index of about 64. The base oil employed consisted of a blend of about 40% conventionally refined coastal neutral oil and 60% solvent refined Mid-Continent neutral oils. The grease compositions were analyzed and tested as in Example IV. For comparison, the base grease without the additive of the present invention was also analyzed and tested. The results are shown in Table II below.

TABLE II

| Additive of Example | | I | II | III |
|---|---|---|---|---|
| Percent Additive | None | 2.0 | 2.0 | 2.0 |
| ASTM Dropping Point, °F | 380 | 379 | 446 | 475 |
| ASTM Penetrations: | | | | |
| Unworked | 325 | 281 | 302 | 305 |
| Worked 60 Strokes | 337 | 325 | 318 | 328 |
| 100,000 Strokes | 355 | 354 | 345 | 360 |
| MIL-G-10924A Pressure Bleed, percent Separated Oil | 15.6 | 11.3 | 10.0 | 10.5 |
| Wheel Bearing, 660 r.p.m., 250° F., Leakage, grams | 5.2 | 5.0 | 3.6 | 7.4 |
| 4 Ball Wear, 1800 r.p.m., 130° F., 10 kg., 1 hour, mm. scar | 0.36 | 0.45 | 0.40 | 0.43 |
| 4 Ball EP: | | | | |
| Mean Hertz Load | 19.9 | 24.2 | 31.2 | 24.5 |
| Weld, kg | 141 | 126 | 141 | 141 |
| Timken EP: | | | | |
| Pass, lbs | 6 | 12 | 12 | 12 |
| Fail, lbs | 9 | 15 | 15 | 15 |
| Norma-Hoffman Oxidation: | | | | |
| P.s.i. drop, 100 hours | | 25 | 6 | 7 |
| P.s.i. drop, 500 hours | | | 51 | |
| Hours, 55 p.s.i. drop | 61 | 360 | | 272 |

Examples II and III in Table II also show the ability of the additives of the present invention to enhance the dropping points of greases. A probable reason for the additive of Example I not increasing the dropping point of this grease is that a higher concentration of this additive is required in softer greases. It was effective at the 2% level as shown in Table I in a harder grease.

It should be noted, furthermore, that the data of Tables I and II also show that the additives of the present invention improve the base grease in other respects. For instance, the additives reduced bleed as demonstrated by the MIL-G-10924A pressure bleed test, improved the extreme pressure properties as shown by the Mean Hertz Load in the Shell 4-Ball EP Test and the Timken Break-Down Load values and improved the oxidation stability of the grease as shown by the Norma-Hoffman Oxidation Test.

It is claimed:

1. A grease composition comprising a lubricating oil base thickened to grease consistency with a metal base fatty acid soap and having incorporated therein a compound having the general formula:

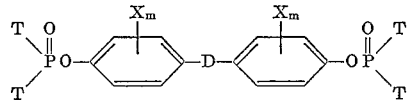

wherein P is phosphorus, O is oxygen, X is halogen of 17 to 53 atomic number, $m$ is 1 to 4, D is a lower aliphatic divalent hydrocarbon radical of 1 to 4 carbon atoms and T is a radical selected from the group consisting of

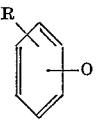

and

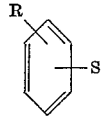

in which O is oxygen, S is sulfur and R is an alkyl radical of 1 to 20 carbon atoms with the proviso that at least one T on each phosphorous atom is

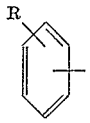

said compound being present in an amount sufficient to increase the dropping point of the composition.

2. The grease composition of claim 1 wherein X is chlorine and one of the T radicals on each phosphorous atom is

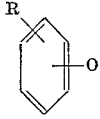

while the other T radical on the same phosphorous atom is

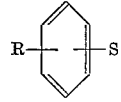

R in said radicals being an alkyl group of 4 to 20 carbon atoms.

3. The grease composition of claim 1 wherein the compound is added in an amount of about 0.1 to 10 weight percent.

4. The grease composition of claim 1 in which the soap is lithium 12-hydroxy stearate.

5. The grease composition of claim 4 wherein the lubricating oil is a mineral oil.

6. The grease composition of claim 1 wherein the lubricating oil is a mineral oil.

References Cited in the file of this patent
UNITED STATES PATENTS

| | | |
|---|---|---|
| 2,245,649 | Caprio | June 17, 1941 |
| 2,637,694 | Peterson et al. | May 5, 1953 |
| 2,872,417 | Jordan et al. | Feb. 3, 1959 |
| 2,959,543 | Martinek et al. | Nov. 8, 1960 |

UNITED STATES PATENT OFFICE
CERTIFICATE OF CORRECTION

Patent No. 3,174,931                          March 23, 1965

Howard J. Matson et al.

It is hereby certified that error appears in the above numbered patent requiring correction and that the said Letters Patent should read as corrected below.

Column 6, lines 48 to 53, the formula should appear as shown below instead of as in the patent:

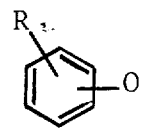

Signed and sealed this 15th day of February 1966.

(SEAL)
Attest:

ERNEST W. SWIDER                          EDWARD J. BRENNER
Attesting Officer                            Commissioner of Patents